Figure 1:
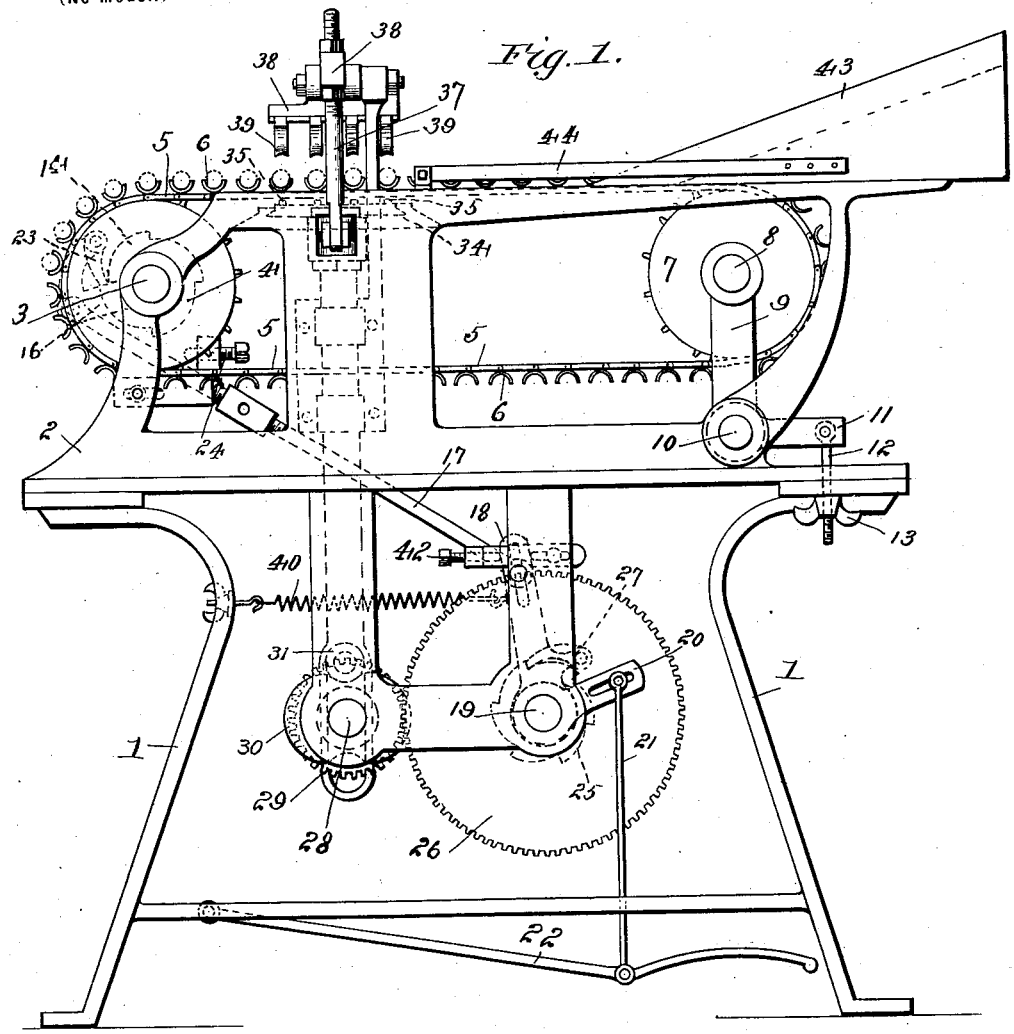

No. 628,151. Patented July 4, 1899.
N. WEISS & F. J. HAGEN.
CIGAR BRANDING MACHINE.
(Application filed July 16, 1898.)

(No Model.) 2 Sheets—Sheet 1.

Witnesses
G. H. Walmsley.
M. A. Davis.

Inventors
Nathan Weiss and F. J. Hagen
By Davis & Davis
Attorneys

THE NORRIS PETERS CO., PHOTO-LITHO., WASHINGTON, D. C.

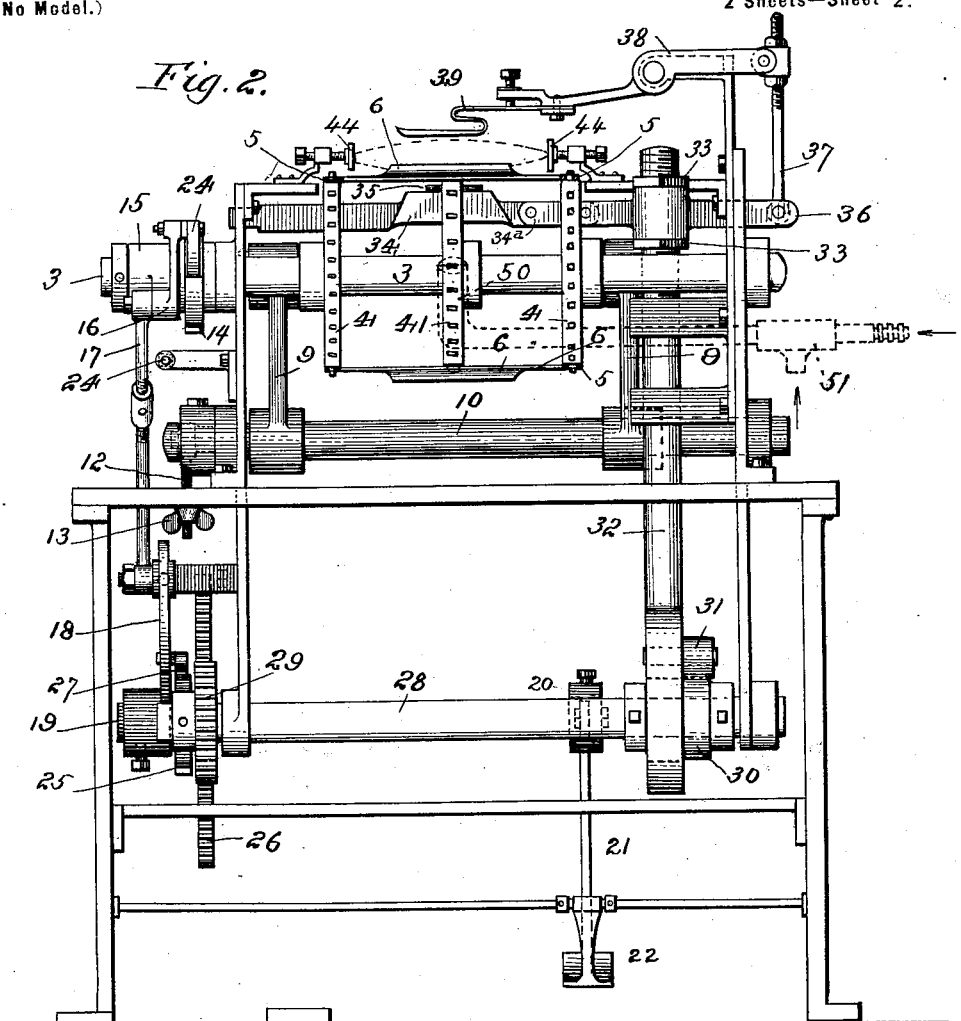

UNITED STATES PATENT OFFICE.

NATHAN WEISS AND FERDINAND J. HAGEN, OF NEW YORK, N. Y.

CIGAR-BRANDING MACHINE.

SPECIFICATION forming part of Letters Patent No. 628,151, dated July 4, 1899.

Application filed July 16, 1898. Serial No. 686,092. (No model.)

*To all whom it may concern:*

Be it known that we, NATHAN WEISS and FERDINAND J. HAGEN, citizens of the United States, and residents of the borough of Manhattan, city and State of New York, have invented certain new and useful Improvements in Cigar-Branding Machines, of which the following is a specification, reference being had therein to the accompanying drawings, in which—

Figure 1 is a side elevation of the machine. Fig. 2 is a front view, a portion of the carrying-chain being removed; and Fig. 3, a detail horizontal sectional view showing a portion of the carrying-chain and its front supporting-wheels.

The invention has for its object to provide a machine of simple construction which may be rapidly and easily operated and in which the branding operation will be performed by a constant force, whereby the brands will be impressed upon the cigars with a uniform pressure.

Another object of the invention is to provide means for insuring the discharge of the cigars from the conveyer after they have been branded.

The invention consists in the novel combination and arrangement of parts hereinafter described, and particularly pointed out in the claims appended.

Referring to the various parts by numerals, 1 designates a suitable support upon which are mounted two vertical side frames 2. In the front ends of these side frames is mounted a transverse horizontal shaft 3, which carries two sprocket-wheels 4. These wheels are a suitable distance apart, and over them run chains 5, which are connected by parallel transverse troughs or cups which receive the cigars and with them constitute the cigar-carrying chain or belt. At the rear of the machine the chains 5 pass over sprocket-wheels 7, which are mounted on a shaft 8, and this shaft is journaled in the upper ends of pivoted arms 9, whose lower ends are secured to a rock-shaft 10, which is mounted in the side frames. Projecting rearward from this rock-shaft is an arm 11, from which depends a screw-threaded rod 12, which carries a thumb-nut 13, which abuts against a fixed stop. By means of this arrangement the carrying-belt may be tightened or loosened, as desired.

Upon one end of the shaft 3 is rigidly secured a ratchet-wheel 14, and adjacent to said wheel on said shaft is mounted a loose sleeve 15, which is formed with a forward-extending arm 16. To the forward end of this arm is secured one end of an adjustable rod 17. This rod extends rearward and downward, and its rear end is adjustably connected to an upward-extending arm 18, which is rigidly mounted on a rock-shaft 19, journaled in the support 1. Projecting upward and rearward from rock-shaft 19 is an arm 20, and connected to said arm is a treadle-rod 21, which is connected to treadle 22. Carried by the arm 16 is a pawl 23, which engages the ratchet-wheel 14. Carried by the frame in a position to be engaged by the arm 16 at the limit of its downward movement is an adjustable stop 24. From the foregoing it will be seen that by depressing the treadle the carrier or conveyer-belt will be fed forward and that by means of the stop 23 the exact amount of movement desired may be permitted.

Loosely mounted on the shaft 19, adjacent the arm 18, is a ratchet-wheel 25, and secured to said ratchet-wheel is a large gear-wheel 26, and carried by the arm 18 is a pawl 27, which engages the ratchet 25. Forward of the rock-shaft 19 is journaled a shaft 28, upon which is secured a small gear 29, which meshes with the gear 26. Secured to this shaft, at one end thereof, is an elliptical cam 30, with which engages a roller 31, carried by a vertically-reciprocating bar 32. The circumference of this cam at the ends of its shorter diameter is depressed to form recesses in which the roller 31 drops alternately at the end of each half-rotation of the cam. The roller 31 follows the surface of the cam during its rotation, and the object of the depressions is to prevent the momentum of the rotating gear-wheels and shaft 28 from carrying the cam around more than a half-rotation. The roller dropping into the recess in the cam and held there by the weight of the bar 32 and the mechanism carried thereby will effectually hold the cam in proper position to begin the next movement. During each half-rotation of the cam the bar 32 is raised and then permitted to lower, always coming to rest with roller 31 in one of the recesses in the cam. The lower end of bar 32 is slotted and fits over the shaft 28 and is guided thereby, and its upper end is threaded to receive two nuts 33, which clamp between them the head of the horizontal die-carrying frame 34, which extends across the machine just under the cigar-carrying belt and is rigidly jointed at 34ª. On this frame 34 is secured a suitable branding-die 35, and the troughs or cups 6 are slotted to permit said dies to engage the cigars. The free end of the die-carrying frame is guided in a slot in the frame or by any other suitable means.

Projecting outward from the head of the die-carrying frame is an arm 36, to which is pivoted a rod 37. This rod at its upper end is pivotally and adjustably secured to a lever 38, which is pivoted to a suitable support, its free end extending out over the carrying-belt. To this free end is secured a series of adjustable spring-clamps 39, which are adapted to engage the cigars in the troughs of the carrying-belt. These clamps are each formed of a strip of spring metal rigidly secured at one end to the under side of lever 38, their free ends being substantially horizontal. These free ends are concaved on their under side in order to fit down on the cigars in the troughs. Set-screws 39ª, carried by lever 39, bear upon the upper side of the spring-clamp R, and by means of them the pressure brought on the cigars may to a certain degree be regulated.

The cigars are fed into the troughs of the carrier from the table 43, and the operator performs the moving of the carrier and the branding operations by operating the treadle. When the treadle is depressed, the carrier is moved far enough forward to bring a series of filled troughs under the clamps, this being accomplished through the medium of rod 21, arms 20 and 18, rod 17, and ratchet devices 14 and 24, the parts being so proportioned that a series of four cigars are brought forward at each depression of the treadle. The operation of thus moving the carrier distends spring 40, as is obvious. When the treadle is released, the spring 40, connected to arm 18 and to the frame, returns the belt-feeding mechanism to its normal position and in doing so causes pawl 27 to partially rotate ratchet 25 and with it gear 26. The movement of gear 26 causes a half-rotation of gear 28, and cam 30 forces upward rod 32, carrying the dies up to the cigars. As the dies move upward the clamps 39, through the medium of rod 37 and lever 38, descend and clamp the cigars during the branding operation.

To insure the cigars dropping from the carrier or carrying-belt after they are branded, an ejector-wheel 41 is mounted on shaft 3 and is provided with projections which enter the slots in the bottoms of the troughs 6 and raise the cigars off the bottoms and release any which may have been stuck thereon during the branding operation.

An adjustable stop 42 is secured in a position to be engaged by the end of arm 18 to stop the belt-feeding mechanism in the proper position to begin the feeding operation.

As shown in the drawings the parts are proportioned to feed and brand four cigars at each operation of the treadle; but it is obvious that they may be arranged so that any desired number may be branded at each operation. An inclined feeding-table 43, down which the cigars are fed to the chain, is provided, and adjustable guides 44 extend forward from said table to facilitate the proper arranging of the cigars in the carrying-belt.

The advantage in providing the spring 40 to do the branding operation is that the brand will be impressed upon the cigars with a uniform force and the dies will remain in contact with the cigars the same length of time, which is especially advantageous in view of the fact that the dies are heated at every operation. In this way a very uniform branding will be secured. The pressure upon the cigars by the clamps at times causes them to adhere to the carrying-belt, and if they are not released at the proper time they may be carried partly through the machine and be destroyed. To avoid this, the ejector-wheel 41 is provided. This wheel insures their release at the proper time.

The mechanism employed to return the belt-feeding mechanism to its normal position and to perform the branding operation—namely, the spring 40 or its equivalent—is particularly adapted for foot or hand power machines; but it may be employed on machines operated by other power. It will also be noted that the machine may be employed in branding other articles than cigars.

The branding-dies are heated in any suitable manner, preferably by a gas-burner 50, supported under the die-carrying arm and connected to a pipe 51, as shown in dotted lines in Fig. 2.

Having thus fully described our invention, what we claim, and desire to secure by Letters Patent, is—

1. In a branding-machine, the combination of a frame, a carrying-belt provided with slotted troughs, means for operating this belt, a vertical bar 32 supported at one side of the carrier-belt, means for reciprocating this bar, a die-frame 34 secured to said bar at its upper end and extending inward under the carrier-belt and provided with dies adapted to pass through the slots in the troughs when bar 32 is raised, an arm 36 carried by said bar and extending in the opposite direction from the die-frame, a lever 38 pivoted on the frame above bar 32, this lever being provided at its inner end with resilient clamps adapted to press down upon the articles being branded, and a link 37 connecting the other end of this lever to the arm 36, as and for the purposes set forth.

2. In a branding-machine, the combination of a frame, a carrier for the articles to be branded, a branding mechanism, mechanism for moving the carrier to the branding mechanism, and a device engaged by the carrier-moving mechanism during the movement of the carrier and thereby moved out of its normal position, said device being adapted to be released after the movement of the said carrier, and means adapted to completely operate the branding mechanism independently of the means for moving the carrier, this means being operated by the return of said device to its normal position.

3. In a branding-machine the combination of a frame, a carrier for the articles to be branded, a branding mechanism, means for operating it, mechanism for moving the carrier to the branding mechanism, and a spring arranged to have its tension increased by the operation of the carrier-feeding mechanism and to be released after the operation of said mechanism, and means whereby the spring upon its release will operate the branding mechanism and perform a complete branding operation.

4. In a machine for branding articles the combination of a support, a carrying-belt, a branding mechanism, means for feeding the carrying-belt to the branding mechanism, a spring connected to the feeding mechanism and adapted to be distended when said mechanism is operated and to return said mechanism to its normal position when released, and means connecting the branding mechanism and the belt-feed mechanism whereby when the belt-feeding mechanism is returned to its normal position the branding mechanism will be operated and then returned to its normal position or point of rest.

5. In a machine for branding articles the combination of a support, a carrying-belt, a branding mechanism, means for feeding the carrying-belt to the branding mechanism, a lever for operating said belt-feeding mechanism, a spring connected to the belt-feeding mechanism and adapted to be distended when said mechanism is operated, and to return said feeding mechanism to its normal position when the operating-lever is released, and means connecting the belt-feeding mechanism to the branding mechanism whereby when the belt-feeding mechanism is returned to its normal position the branding mechanism will be operated and then returned to its normal position.

6. In a branding-machine the combination of a support, shafts mounted therein, a carrying-belt carried by said shafts a belt-feeding mechanism consisting of a ratchet mechanism mounted on one of the belt-carrying shafts, a rock-shaft, means for operating said shaft, an arm carried by said shaft, a rod connecting said arm to the ratchet mechanism on the belt-carrying shaft, means, as spring 40, for returning said belt-feeding mechanism to its normal position after it has been operated, a branding device, a bar supporting and operating said branding device, a cam for reciprocating said bar to operate the branding device, and means connecting this cam to the rock-shaft whereby when the belt-feeding mechanism is returned to its normal position the branding mechanism will be operated and then returned to its normal position.

In testimony whereof we hereunto affix our signatures, in the presence of two witnesses, this 15th day of July, 1898.

NATHAN WEISS.
FERDINAND J. HAGEN.

Witnesses:
RAY WOLFSON,
S. L. DUTSCH.